(12) United States Patent
Reade et al.

(10) Patent No.: US 12,283,835 B2
(45) Date of Patent: Apr. 22, 2025

(54) POWER DISTRIBUTION MODULE

(71) Applicant: Ark Corporation Pty Ltd., Arndell Park (AU)

(72) Inventors: Andrew Reade, Arndell Park (AU); Garo Afarian, Arndell Park (AU); Shojaeddin Mirfendereski, Arndell Park (AU)

(73) Assignee: Ark Corporation Pty Ltd (AU)

( * ) Notice: Subject to any disclaimer, the term of this patent is extended or adjusted under 35 U.S.C. 154(b) by 262 days.

(21) Appl. No.: 17/696,942

(22) Filed: Mar. 17, 2022

(65) Prior Publication Data
US 2022/0302727 A1   Sep. 22, 2022

(30) Foreign Application Priority Data
Mar. 17, 2021 (AU) ............................. 2021101391

(51) Int. Cl.
*H02J 7/00* (2006.01)
*H02B 1/26* (2006.01)
*H02J 3/00* (2006.01)
*H04W 88/02* (2009.01)

(52) U.S. Cl.
CPC .............. *H02J 7/0068* (2013.01); *H02B 1/26* (2013.01); *H02J 3/0012* (2020.01); *H02J 7/0048* (2020.01); *H04W 88/02* (2013.01)

(58) Field of Classification Search
CPC ...... H02J 7/0068; H02J 3/0012; H02J 7/0048; H02J 7/35; H02J 7/00714; H02J 7/007192; H02J 7/0047; H02J 7/00043; H02J 7/00032; H02J 7/00041; H02B 1/26; H04W 88/02; G06F 1/3212; G06F 11/325

USPC .......................................................... 307/31
See application file for complete search history.

(56) References Cited

U.S. PATENT DOCUMENTS

| | | | | |
|---|---|---|---|---|
| 10,587,118 B2* | 3/2020 | Galin | ..................... | H02J 3/381 |
| 2011/0090726 A1* | 4/2011 | Brotto | ............... | H02J 7/007182 |
| | | | | 363/131 |
| 2014/0088780 A1* | 3/2014 | Chen | .................. | H02J 13/00004 |
| | | | | 700/295 |
| 2014/0191705 A1* | 7/2014 | Takao | ................... | H02J 7/0063 |
| | | | | 320/103 |

* cited by examiner

*Primary Examiner* — Richard Tan
(74) *Attorney, Agent, or Firm* — Adam K. Sacharoff; Much Shelist, P.C.

(57) ABSTRACT

A power distribution module is described, which controls the distribution of battery input power to a plurality of device outlet ports using sensors and relay switches. The power distribution module monitors the voltage, current, and/or power from, and/or temperature of, the module and its conductors. The power distribution module has smartphone management of its power outlet ports. So, the power distribution module as described, includes a housing including one or more power inlets, and a plurality of power outlets; a controller processor configured to receive data from sensors in relation to battery capacity and state of charge, and to receive data on power provided to the power outlets; one or more relays, configured to switch power on or off to one or more of the plurality of power outlets; wherein the controller is configured to switch the one or more relays on or off in response to calculations based on selected threshold conditions. Methods of distributing power with a module based on calculations of power and current and temperature relative to selected thresholds are also described.

18 Claims, 22 Drawing Sheets

POWER DISTRIBUTION MODULE

TECHNICAL FIELD

The present technology relates generally to a power distribution module, for managing battery health by measuring and controlling the distribution of power to various connected devices.

BACKGROUND

Batteries, such as those for campers and caravans, have become robust and powerful, and are used to drive different kinds of devices: fridges, lights, televisions, kettles, chargers, fans and more. These devices are those on which modern campers rely to make the camping experience more fun and relaxing, as well as extending the comfortably-realistic length of a camping trip. With these devices, camping trips can be extended to be months in duration, rather than mere days.

But a battery's useful life can be reduced by improper discharge regimes. For example, there are AGM batteries that are rated to 500 cycles at 50% depth of discharge, while they can obtain 1250 cycles at 25% depth of discharge.

Increasing the capacity of a battery does not just increase the volume required to house the battery, which is already limited in a caravan or campervan. It also increases the weight support required of a caravan or vehicle. But even if a more efficient battery is found; a larger capacity does not necessarily improve service life and reliability.

The present inventor seeks to provide a device which seeks to substantially ameliorate one or more of the above mentioned disadvantages, and/or which at least provides a new and useful alternative to known devices and/or methods.

SUMMARY

Broadly, the present technology provides a battery management module which controls the distribution of battery input power to a plurality of device outlet ports using sensors, relays and switches.

Broadly, the present technology also provides a power distribution module which controls the distribution of battery input power to a plurality of device ports by monitoring the voltage, current, and/or power from, and/or temperature of, the module.

Broadly, the present technology also provides a power distribution module with smartphone management of its power outlet ports.

In one aspect of the present invention there is provided a power distribution module including:
  a housing including one or more power inlets, and a plurality of power outlets, mounted thereon;
  a monitoring processor configured to monitor current and voltage received at the one or more power inlets, and/or configured to monitor power provided to the plurality of power outlets;
  wherein the monitoring processor is configured to provide power consumption data in relation to power flow from the inlet to the plurality of power outlets, to a display wirelessly or otherwise operatively connected to the monitoring processor.

In another aspect of the present invention there is provided a power distribution module including:
  a housing including a plurality of power outlets mounted thereon;
  a controller including a processor configured to receive data in relation to battery capacity and to monitor power provided to the plurality of power outlets;
  one or more measurement sensors in wireless or other data communication with the controller, the one or more measurement sensors configured to monitor aspects of power flow provided to the plurality of power outlets;
  one or more relays in wireless or other data communication with one or more of the plurality of power outlets and the controller, in use to switch power on or off to one or more of the plurality of power outlets;
  wherein the controller is configured to switch the one or more relays on or off in response to processor calculations based on selected conditions sensed by the one or more measurement sensors.

In yet another aspect of the present invention there is provided a method of distributing power to one or more power outlets in a power distribution module having one or more battery inlets and a plurality of power outlets, the method including the steps of:
  receiving, in a controller processor, data in relation to the battery capacity of a battery connected to the power distribution module;
  receiving, in a controller processor, data in relation to elements of power consumption of a plurality of devices connected to a plurality of power outlets;
  calculating, in a controller processor, power consumption data by the plurality of outlets;
  switching, by the controller processor, one or more relays to a safe position in response to the calculated power consumption, relative to a threshold.

In yet another aspect of the present invention there is provided a method of distributing power to one or more power outlets in a power distribution module having one or more battery inlets and a plurality of power outlets, the method including the steps of:
  receiving, in a controller processor, data in relation to the battery capacity of a battery connected to the power distribution module;
  receiving, in a controller processor, data in relation to elements of power consumption of a plurality of devices connected to a plurality of power outlets;
  calculating, in a controller processor, power consumption data by the plurality of outlets;
  displaying, on a screen, on a wirelessly connected mobile device, or screen otherwise connected to the controller processor, the results of the calculated power consumption data by the plurality of outlets;
  providing one or more switch actuators on the mobile device screen or the housing, the one or more switch actuators configured to switch one or more relays to a safe, or engaged, position in response to the displayed power consumption data.

In accordance with a further aspect of the present technology there is provided a method of distributing power to one or more power outlets in a power distribution module having one or more battery inlets and a plurality of power outlets and a plurality of relay switches disposed between, the method including the steps of:
  receiving, in a controller processor, data in relation to the battery capacity of a battery connected to the power distribution module;
  receiving, in a controller processor, data in relation to elements of power consumption of a plurality of devices connected to a plurality of power outlets;

calculating, in a controller processor, power consumption parameter data by the plurality of outlets;

switching, by the controller processor, one or more of the relays to a safe position in response to one or more of the calculated power consumption parameters, relative to a threshold, wherein the safe position includes a first temporary protective dormant phase in response to a first voltage, current or temperature threshold event, followed by a temporary probation phase, in which, if a second voltage or current threshold event occurs, the processor is caused to switch the module to a second dormant phase longer than the first.

In one embodiment the plurality of power outlets are selected from the group consisting of: Anderson sockets; 12V cigarette outlets; merit sockets; USB sockets; Engel sockets; four-pin (Phoenix-type) connector, while any kind of multi-pin connector may be used, including 6-pin, 8-pin, 9-pin, and others.

In one embodiment the housing includes a top wall on which is disposed a display screen, on which the controller processor causes the display of any one or more of: one or more power consumption parameters, including contemporaneous battery current draw, contemporaneous battery voltage, time left to full discharge, highest voltage measured, lowest voltage measured, energy used since charge, contemporaneous energy in use; battery state of charge; battery type.

In one embodiment there is provided in the housing a network module in communication with the controller processor, the network module which may transmit and receive using any suitable wireless protocol for wirelessly communicating with a mobile device. Suitable protocols include Bluetooth, Bluetooth LE, Wifi 802.11, 3G, 4G, 5G and the like.

In one embodiment the controller processor is configured to receive data from a water level sensor wirelessly via its network module, or by a data input port.

In one embodiment the power distribution module includes a water level sensor input port.

In one embodiment the processor is configured to cause the display screen or the mobile device to show data relating to contemporaneous water tank level.

In one embodiment the controller processor is configured to cause the display screen or mobile device to display a status indicator which takes the form of Normal (green) or Voltage protection (amber).

In one embodiment the controller processor is configured to cause the display screen or mobile device to display amber when the controller processor switches a main relay to a safe or off position, wherein the power from the one or more inlets to the plurality of outlets is inhibited.

The main relay, and indeed any form of relay described herein, may be different types of switch.

In one embodiment the relay may be a switch.

In one embodiment the relay may be an electronic switch component.

In one embodiment the relay may be a surface mounted switch component.

In one embodiment the relay may be a transistor.

In one embodiment the controller processor is configured to cause the display screen or mobile device to represent battery state of charge as a closed circle when full, and with a partially closed circle if less than full; wherein the proportion of the circle which is closed being in direct relationship to the percentage of full of the battery state of charge.

In one embodiment the controller processor causes the display screen or mobile device to represent battery state of charge as a numerical percentage disposed within the perimeter of the battery state of charge circle.

In one embodiment the controller processor causes the display screen or mobile device to represent contemporaneous water tank level as a closed circle when full, and with a partially closed circle if less than full; wherein the proportion of the circle which is closed being in direct relationship to the percentage of the tank that is full.

In one embodiment the controller processor causes the display screen or mobile device to represent contemporaneous water tank level of water as a numerical percentage disposed within the perimeter of the water level circle.

In one embodiment the controller processor causes the display screen or mobile device to display a plurality of relay actuator buttons.

In one embodiment the relay actuator buttons are configured to toggle the relays between off and on positions.

In one embodiment the relay actuator buttons are configured to control low current draw devices such as for example, lights, which are connected to the four-pin (Phoenix-type) connector.

In one embodiment the controller processor is configured to cause the display screen or mobile device to present a high level information screen which displays contemporaneous voltage, contemporaneous current draw, contemporaneous power usage, total energy used since last charge, contemporaneous projected time to full discharge, battery type, and battery capacity, and relay actuator buttons.

In one embodiment the controller processor is configured to cause the display screen or mobile device to present a detailed dashboard information screen which displays one or more of: contemporaneous voltage; maximum recorded voltage since last charge on the present battery; lowest voltage recorded since last charge on the present battery; contemporaneous current draw; maximum current draw on the present battery since last charge; contemporaneous power use; module temperature; battery capacity; battery type; energy drawn since last charge for the present battery (Ah); energy drawn from the present battery since last charge (Wh); battery state of charge in percentage and as a circle; water tank level as a percentage and as a circle; relay actuator buttons; and a status indicator.

In one embodiment the controller processor is configured to cause the display or mobile device to display a battery configuration screen which requests certain information regarding the battery from the user, including: battery type, battery capacity, and relay names.

In one embodiment the method includes the step of displaying on the display screen or mobile device a battery configuration screen which requests certain information regarding the battery from the user, including: battery type, battery capacity, and relay names.

In one embodiment the controller processor is configured to cause the screen to display data relating to water tank level.

In one embodiment the controller processor is configured to cause the display screen or mobile device to display a temperature violation screen, which displays the contemporaneous temperature, a status indicator, and a plurality of relay actuator buttons.

In one embodiment the method includes the step of displaying on the display screen or mobile device a temperature violation screen when the processor calculates that the temperature data from the temperature sensor is above a threshold level.

In one embodiment the method includes the step of displaying on the display screen or mobile device a current violation screen when the processor calculates that the current data from the current sensor is above a threshold level.

In one embodiment the method includes the step of displaying on the display screen or mobile device a voltage violation screen when the processor calculates that the voltage data from the voltage sensor is above a threshold level.

In one embodiment the controller processor is configured to cause the display screen or mobile device to display a current violation screen, which includes a current violation indicator, a status indicator, a current measurement maximum which caused the violation, and a plurality of actuator buttons.

In one embodiment there is also provided a main relay which is disposed in a conductor which extends between the power inlet and the plurality of power outlets.

In one embodiment the controller is connected directly to the main relay so as to facilitate rapid switching of the current to the plurality of power outlets to a safe state wherein the main relay switches to an off position in response to a voltage violation event, or current violation event, or a temperature violation event.

In one embodiment there are provided a plurality of relay actuator buttons disposed on the housing for actuation of a plurality of relays to an off or an on position.

In one embodiment the relay actuator buttons are connected to individual low voltage devices such as LED lights.

In one embodiment the display screen on the housing is an LCD screen.

In one embodiment there is provided an inline $12v/5v$ converter for providing power to the USB outlets.

In one embodiment there is provided a charger to charge the battery.

In one embodiment the charger, when supplied, is in one embodiment, wholly disposed inside the housing at position.

In one embodiment the charger is a standalone charger which can be plugged in to the housing.

In one embodiment the charger can be connected to a power supply in the form of a switch mode power supply.

In one embodiment the charger is a buck boost charger.

In one embodiment the charger is electrically connected (or wirelessly connected so that data may flow therebetween) to the processor so that there is a suitable stage of charging implemented, and provided to the battery and/or other power outlets.

In one embodiment the charger is configured to provide different charging stages, including: Desulphation; Soft Start; Bulk; Absorption; Test; Recondition and Float.

In one embodiment a solar panel provides power to the outlets.

In one embodiment the solar panel provides charge to the charger which then charges the battery under the control of the processor.

In one embodiment of the method, the processor is configured to receive data from the current and voltage sensors and in response commands the charger to provide the battery or outlets with suitable charge.

In one embodiment the method includes powering the module with mains power to charge the battery.

Advantages

Advantageously, embodiments of the power distribution module provide automatic switching to safe mode when battery consumption will reduce battery charge. Also, the power distribution module and method predicts the time to full discharge at any contemporaneous discharge rate. The power distribution module and method also allow a user to note the effect of a change in discharge behaviour, such as switching on a kettle or heavy user, or light-duty device such as a lamp. These advantages are provided to a portable mobile device for added convenience.

Clarifications

In this specification, where a document, act or item of knowledge is referred to or discussed, this reference or discussion is not an admission that the document, act or item of knowledge or any combination thereof was at the priority date:

(a) part of common general knowledge; or
(b) known to be relevant to an attempt to solve any problem with which this specification is concerned.

It is to be noted that, throughout the description and claims of this specification, the word 'comprise' and variations of the word, such as 'comprising' and 'comprises', is not intended to exclude other variants or additional components, integers or steps.

DETAILED DESCRIPTION OF AN EXAMPLE EMBODIMENT

Figure 1:
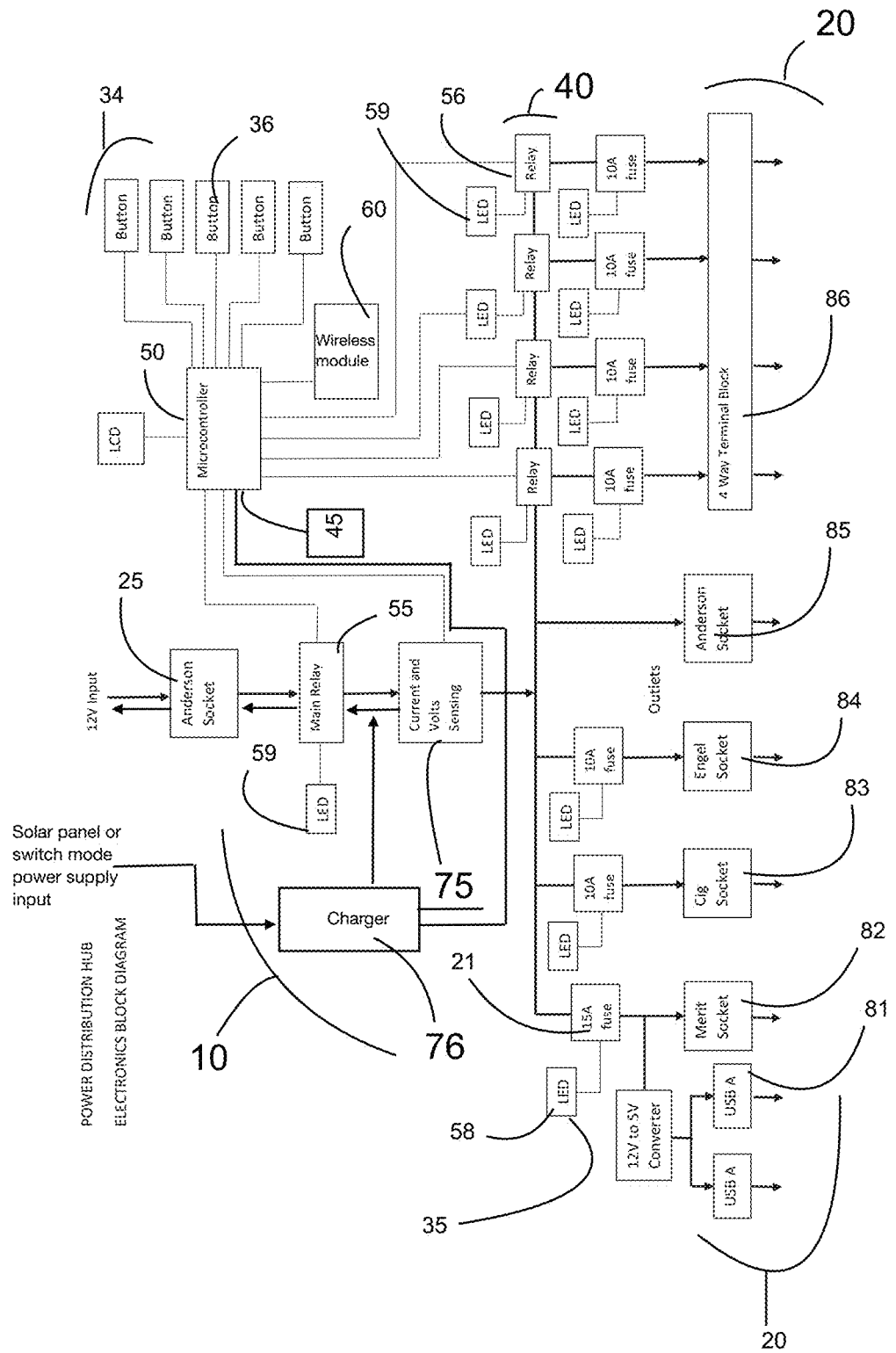
FIG. 1 is an electronics block diagram of a power distribution module.
Figure 2:
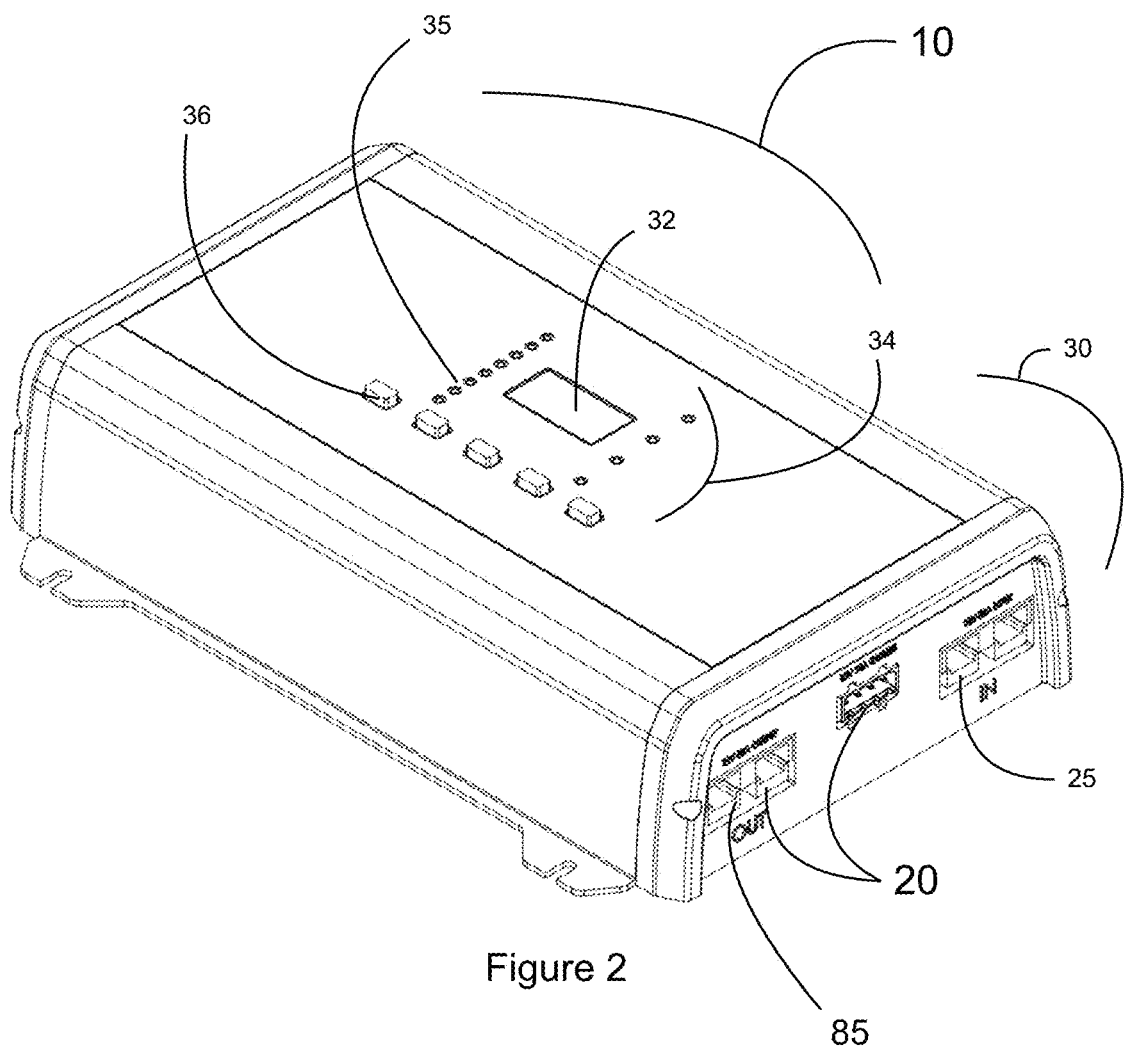
FIG. 2 is an isometric view of a power distribution module which houses the electronics shown in block diagram form in FIG. 1.
Figure 3A:
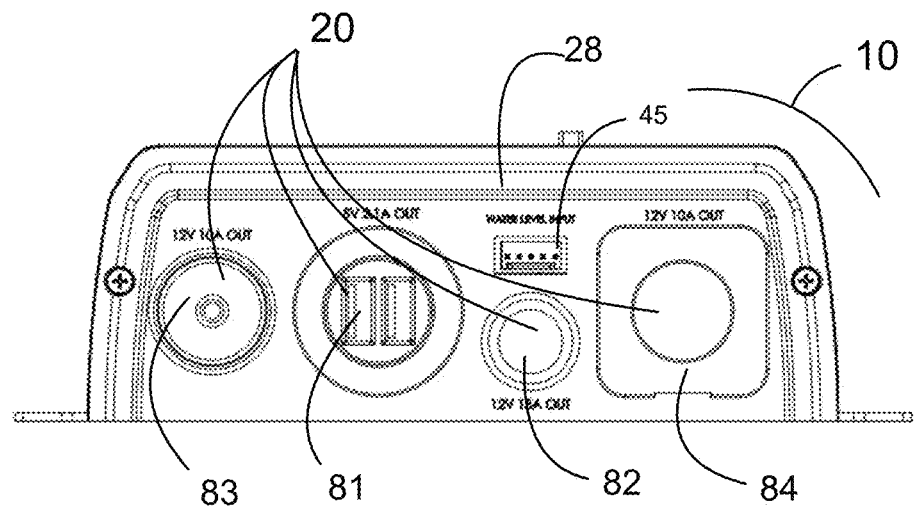
FIG. 3A is one end view of the power distribution module showing a plurality of power outlets and a data inlet for water level data.
Figure 3B:
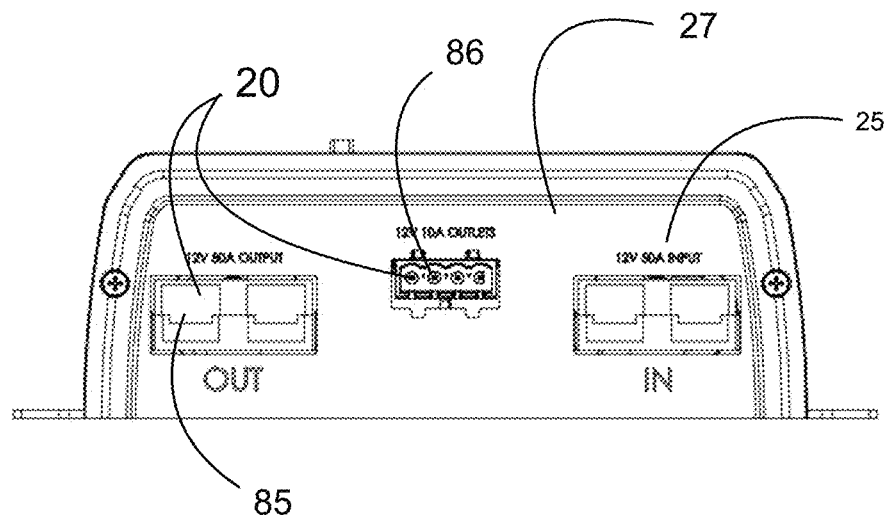
FIG. 3B is a view of the other end showing a power inlet and two power outlets.

Inside a battery, a complex chemical reaction takes place. The reaction can be difficult to mathematically model, and the time to full charge or discharge changes depending on state of charge, load, temperature, age of battery and many other factors. These factors can cause a surprise fall in the state of charge. It is useful to take prompt action, and also to be promptly informed, when those falls occur, so that the user is not suddenly left with no power at hand, to power refrigeration, lighting, cooling and the like. Providing better data, and/or more timely data, to a processor which controls a battery, can provide longer battery life, and more predictable battery performance.

Referring to the drawings there is shown a battery management module generally indicated at 10, which controls the distribution of battery input power to a plurality of outlet ports 20 using sensors 75, a processor 50, and relay switches 40. The power distribution module 10 in use takes prompt action to protect a battery to which it is connected, by automatically controlling the distribution of battery input power to the plurality of outlet ports 20. It does that by monitoring and calculating power parameters, including the voltage, current, and/or power from, and/or temperature of, the module 10, and switching the relay switches according to an algorithm. Via a wireless module 60, the power outlet ports 20 of the power distribution module 10 are in wireless communication with, and managed by, smartphone 90, so that a user can be quickly apprised of a situation that requires immediate attention and make changes if required.

The embodiment of battery management module 10 shown includes a housing 30 and a display 32 on the housing 30. A control zone 34 with a plurality of user actuators 36 is disposed on the housing so that a user can make changes to the load on the battery, by switching lights on or off as required, or by switching the main relay on or off. The control zone 34 is disposed adjacent the display 32 on the housing 30. The user can also input data to the processor 50, about the battery, via the control zone 34 or via the smartphone 90.

The display 32 includes an LCD or LED or OLED or touch screen 33 on a top face of the housing 30, as well as a plurality of indicator lamps 35 for indicating the status of power flow to the power outlet ports 20.

The battery management module 10 includes a power inlet 25 at right end 27, in the form of an Anderson socket 25; the plurality of power outlets 20 is mounted on the housing at the left end 28, and includes two USB sockets 81, a Merit socket 82, cigarette lighter socket 83, Engel socket 84. There is also an Anderson socket 85 disposed at the right end 27. There is also a 4-way terminal block 86 for lights and other loads (such as for example a shower tap relay switch), which can be individually operated by individual user actuator buttons 36, mounted either on the housing 10 or on a smartphone 90 display. This arrangement helps users during setup, in that the inlet is at right end 27, and many of the managed outlets are at the left end 28. The port arrangement, right-left, where the inlet ports 25 are on the right end 27 and the outlet ends 20 are generally on the left end 28, assists with visualising, for a user, the power flow in the housing, which is generally, across the housing 30 from the right end 27 to the left end 28.

The housing 30 further includes the monitoring processor 50 which is configured to monitor current and voltage between the inlet 25 and the outlet 20, using sensors 75 which are disposed downstream of a main relay switch 55. The monitoring processor 50 is configured to provide power consumption data measured at the sensors 75 to the display 32 and, via the wireless module 60, to the mobile device display 90. The processor 50 is also configured to receive data in relation to battery capacity via the mobile device 90 or user actuators 36.

The sensors 75 may be wirelessly connected or hard wired or disposed on a circuitboard with the controller 50, and the controller 50 is wirelessly or on a circuitboard with the main relay 55 and a plurality of other small relays 56 so as to signal them to switch on or off, in accordance with user intention via actuators 36 (or their equivalent on the smartphone 90) or the algorithm.

Each power outlet 20 is protected by a fuse 21 which is disposed downstream of a relay. Also, each power outlet 20 is associated with a fuse indicator LED 58 which is disposed on the housing 30, as part of the display 32, and configured to indicate whether the fuse 21 is in an open or closed position.

Each relay 55 and 56 is also associated with a relay indicator LED 59 on the housing 30, as part of the display 32, which is configured to indicate whether the relay is in an open or closed position.

The processor 50 is also configured to receive a signal from the relay to transmit the status of the relays 55 and 56 to the smartphone 90.

A water tank level port 45 for the connection of a water tank level sensor is provided. The port 45 is connected to the processor 50.

Example

To configure the module 10, a user takes the module 10 and connects Anderson socket 25 to battery (not shown). This connects power to the module 10. The Anderson socket 25 is disposed at right end 27 of the module and the power is configured to flow through the housing to the outlets which are mostly disposed at the left end 28 of the module. The power being configured to flow through the housing in one direction from ports 25 at right end 27 to ports 20 at the left end 28 provides a convention to facilitate clear visualisation of power flow as well as minimises time to set up the device.

Configuration

The user then configures the battery (not shown) as set out in the paragraphs below.

The user downloads a smartphone app from a server (not shown) to their smartphone 90. The app causes the mobile phone 90 to display configuration screens, monitoring screens and control screens on command, shown variously in FIGS. 4 to 11.

The processor 50 and phone 90 search for one another with their wireless units 60 and then the user can then identify the module 10 by selecting its name from a list of nearby devices.

A configuration screen is then shown (examples in FIGS. 6 and 11), in which the user is asked to input characteristics of the battery, including whether it is a lithium battery, and its capacity in Ah. The user (FIG. 11) can also name the relays 56, which would be for convenience to label the lights in terms of their location (annex, bedroom, kitchen etc).

This battery capacity and battery type data is stored in the processor 50 and the processor 50 can then, faster and more accurately, continuously monitor the charge in the battery, by Coulomb counting. The entry of this data facilitates the skipping of a step in the coulomb counting cycle, such that the processor and system does not have to cycle a battery before it can be confident of the charge and capacity of the battery.

The loads are then connected to the ports 20 at the left end 28 of the module 10. That is, loads are connected to the USB port 81, Merit socket 82, cigarette socket 83, Engel socket 84 and Anderson socket 85 if required. If available, the water tank sensor 45 is connected at the right end 27 and connects to the processor 50 for monitoring of the water level on board the caravan or camper (not shown). Light loads are then connected to the 4-way terminal block 86.

Figure 4:
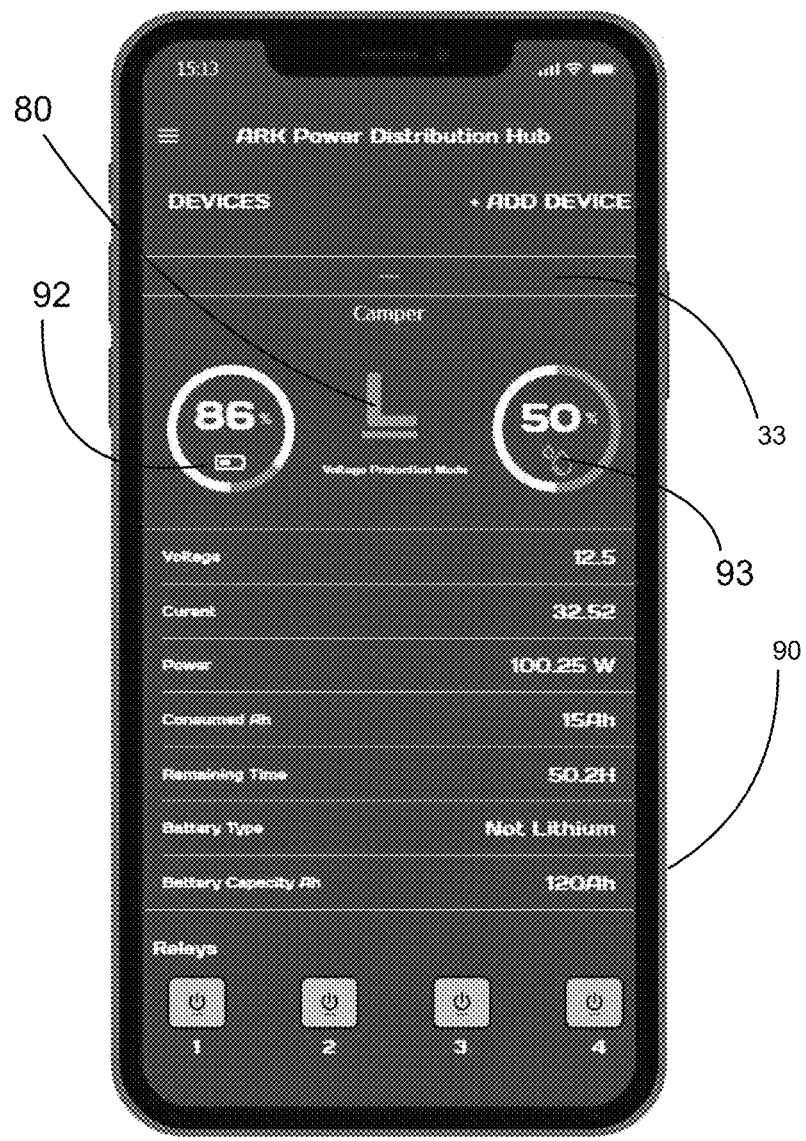
FIG. 4 is a high level information and actuation screen for monitoring and distribution of power to a plurality of outlets.
Figure 5:
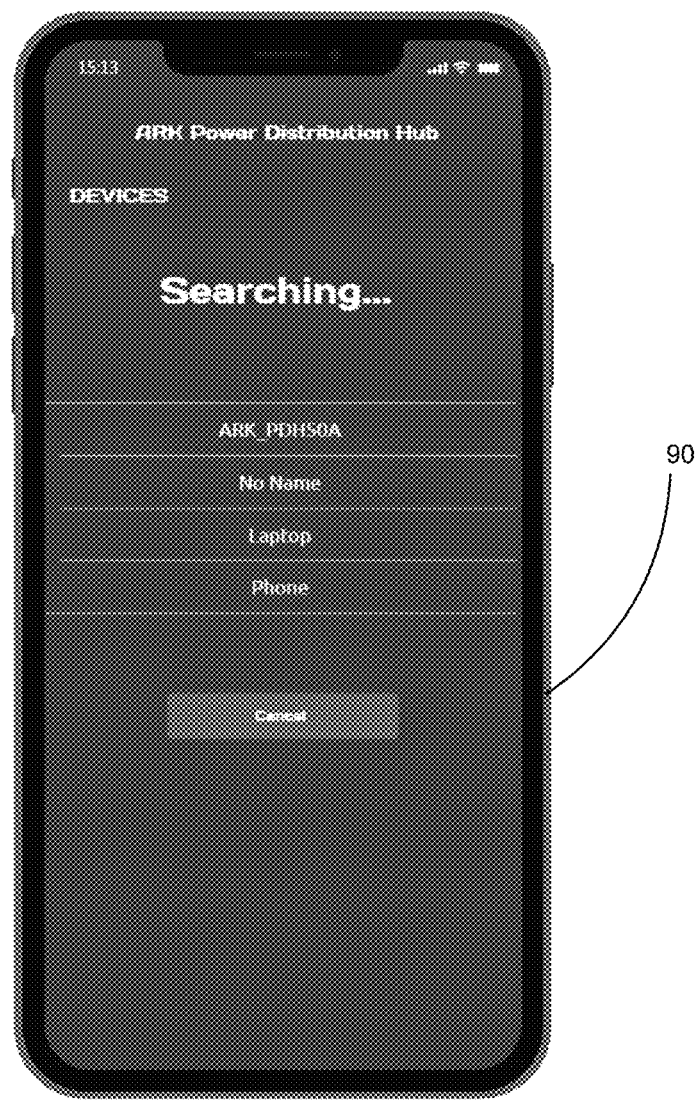
FIG. 5 is a configuration screen shown during setup, the screen facilitating the selection of, and handshaking with, the mobile device with the network module in the power distribution module.
Figure 6:
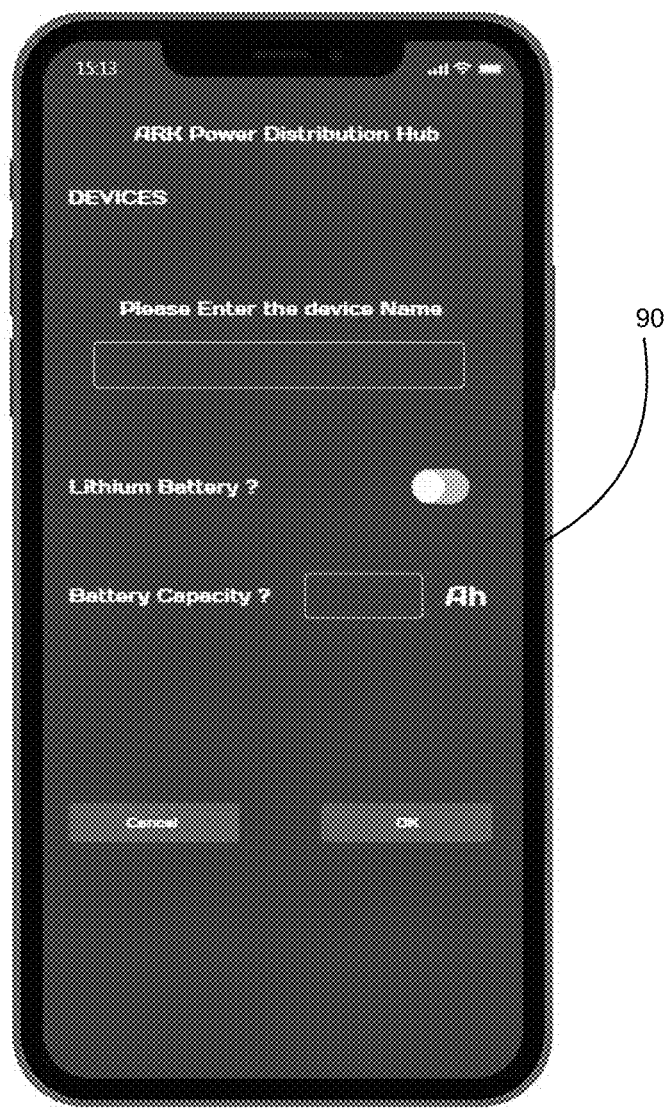
FIG. 6 is a configuration screen.
Figure 7:
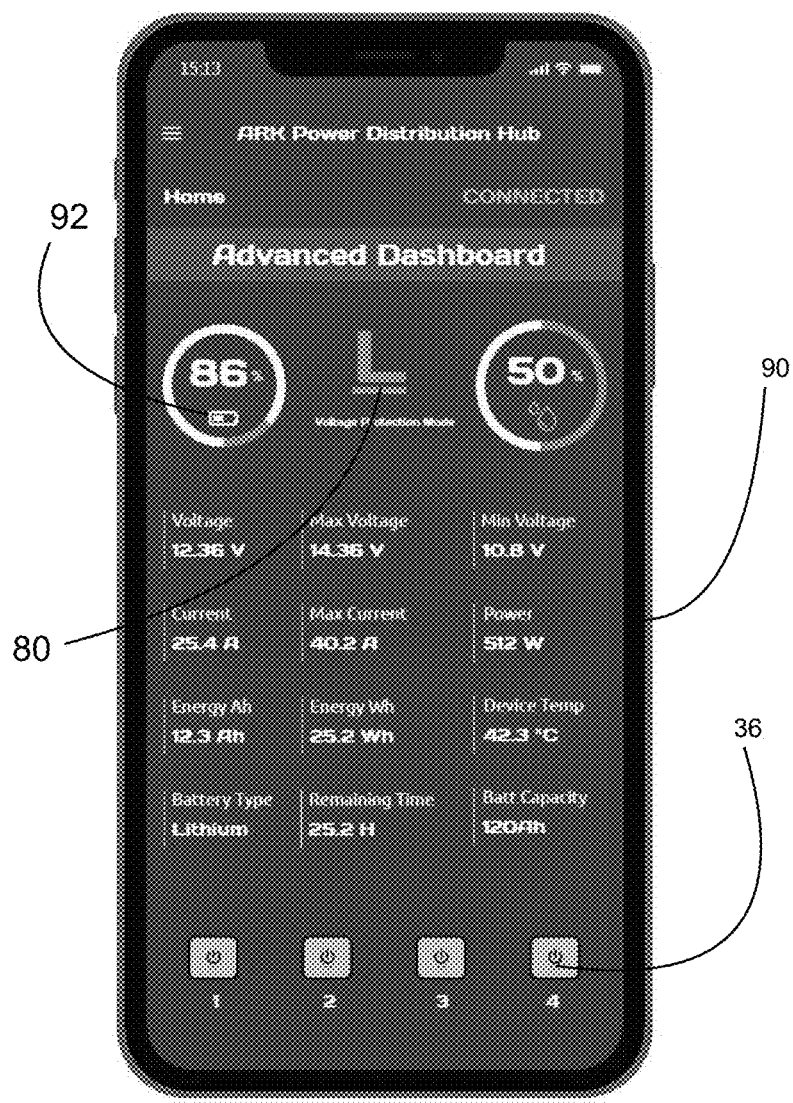
FIG. 7 is an advanced dashboard.
Figure 8:
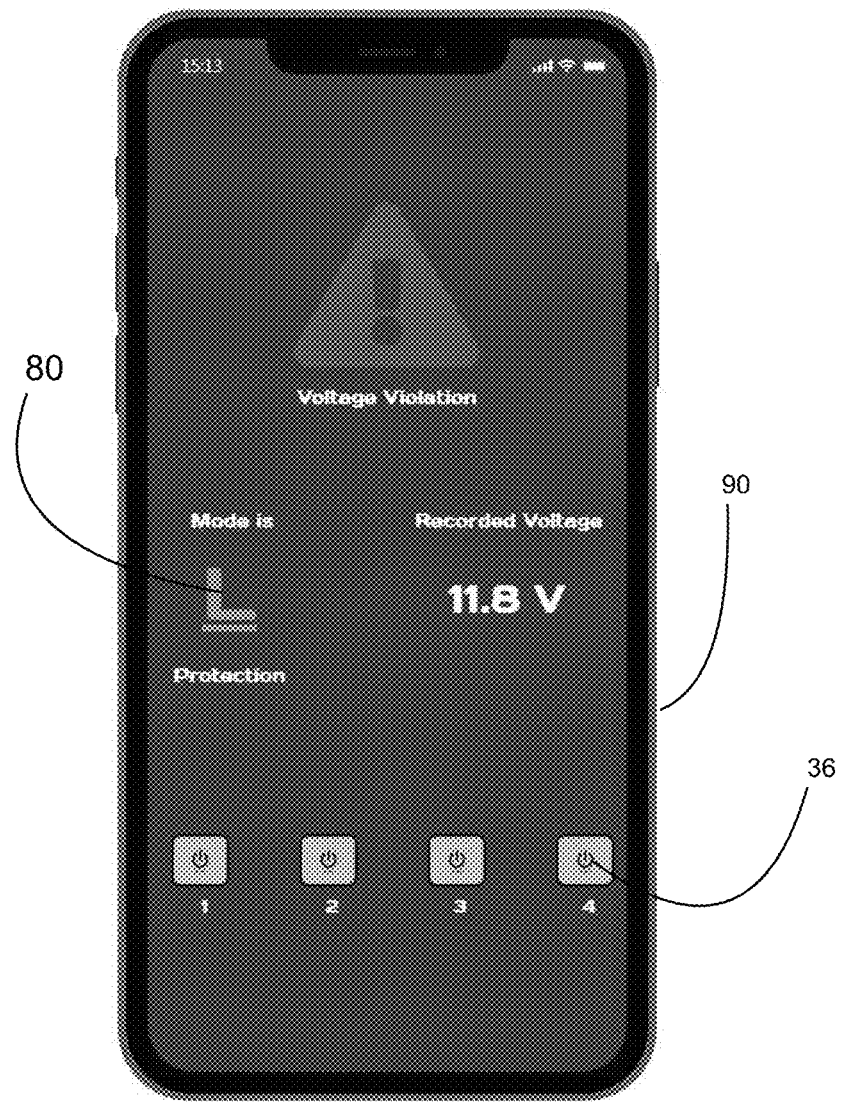
FIG. 8 is a voltage violation screen.
Figure 9:
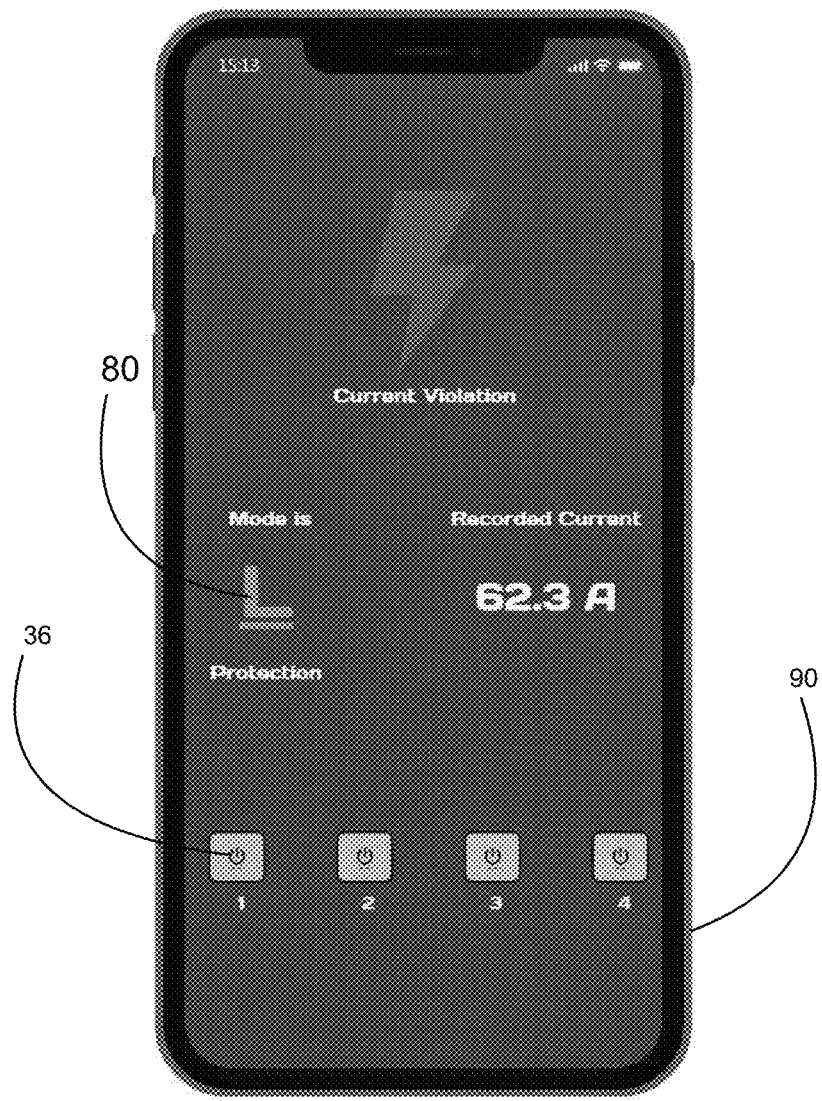
FIG. 9 is a current violation screen.
Figure 10:
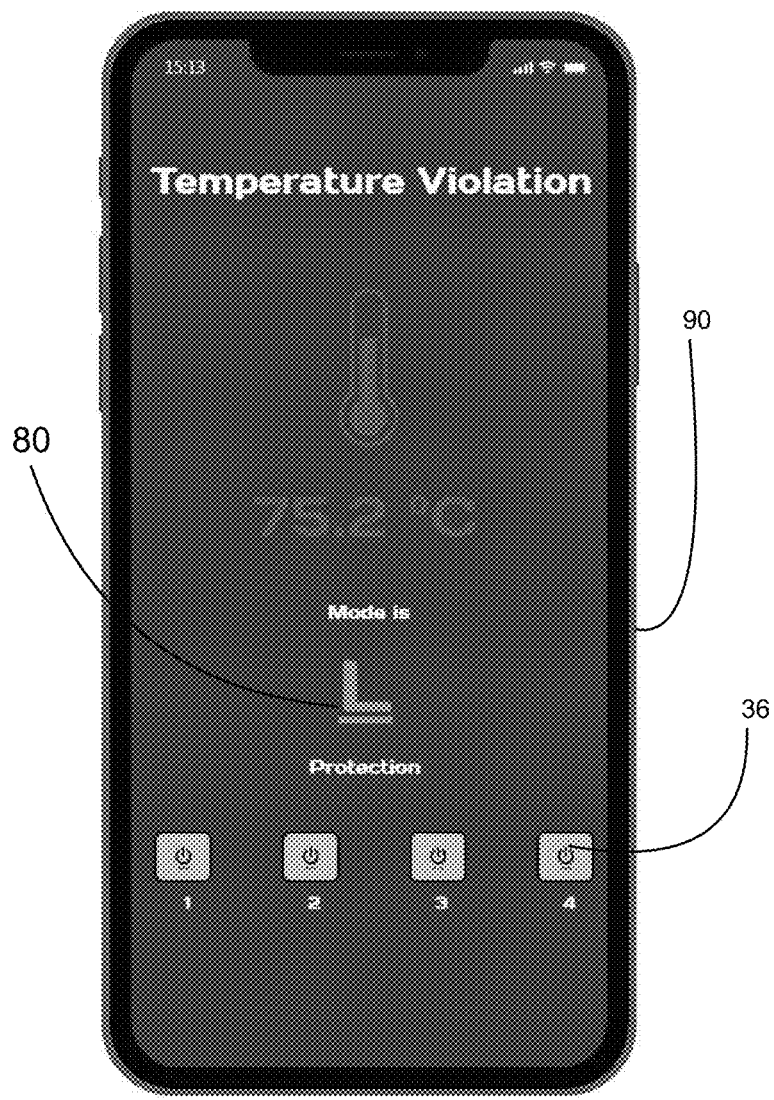
FIG. 10 is a temperature violation screen.
Figure 11:
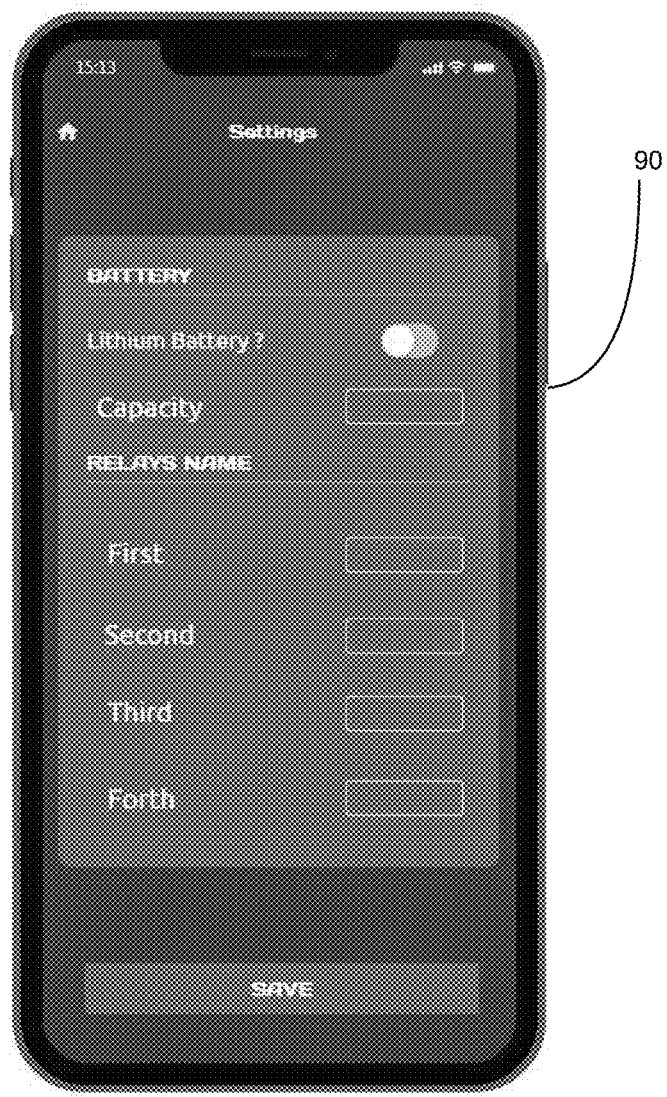
FIG. 11 is a battery and relay actuator button configuration screen.

The battery then is being managed by processor 50 and then the screen shown at FIG. 4 is displayed on the display screen 32 of the mobile device 90 and also on the housing 30. The processor 50 causes the relatively continual update of the data on the screen, which is configured to show the state of charge of the battery at 92 (8.9%), the water tank capacity 93, and battery characteristics such as contemporaneous voltage, current, power drawn, power consumed, remaining time to discharge, and the like. These quantities are updated by the processor using its onboard algorithms. The app or the processor 50 causes the screen 32 or the mobile device 90 to represent battery state of charge and the water tank level 93 as a closed circle when full, and with a partially closed circle if less than full; wherein the proportion of the circle which is closed being in direct relationship to the percentage of full of the battery state of charge. The display screen 32 or mobile device 90 is also caused to represent battery state of charge as a numerical percentage disposed within the perimeter of the battery state of charge circle. This is shown in FIGS. 4 and 7.

In normal operation, to update the dashboard data, the sensor 75 detects voltage, temperature and current in the line between inlet 25 and outlet 20. The sensor data is sent to the processor 50.

In normal operation, the data is updated in the cells, for monitoring by the user, either on the high level dashboard, where there are a few main items of data, (FIG. 4) or on the advanced dashboard (FIG. 7) which has more detailed data. Each dashboard includes relay actuators 36 which can switch on lights via relays 56 and the wireless module 60.

In normal operation, the temperature sensor 75, measures the temperature of the inside of the housing 30 or temperature of a conductor (not shown), and sends that data to the processor 50, which compares it with a threshold. The threshold in the embodiment shown is 85 degrees Celsius, but it could be 75, 80, 90 or other suitable temperature. In temperature overload, which is the circumstance where the processor 50 detects a temperature of greater than the threshold, the processor then causes the display of a temperature violation screen, shown in FIG. 10, and switches relay 55 to the safe or off position. The temperature continues to be monitored by the sensor 75 and the processor 50 keeps comparing the sensed temperature data with that of a re-start threshold, which may be 50, 55, 60 or some suitable temperature.

The processor 50 causes the switching of the main relay 55 back to the on position when it receives data from the sensor 75 that the temperature has reached 55 degrees Celsius or the suitable threshold.

Voltage Protection

For its protective function, the processor 50 compares the voltage with a threshold, for some batteries, being 11.8V for some batteries, and 11.1, 11.2, 11.3, 11.4, 11.5, 11.6, 11.7, 11.9, 12.0, 12.1, 12.2, 12.3, 12.4, 12.5, 12.6, 12.7, 12.8, 12.9, 13V and other different voltages for different batteries.

Protection Mode H, M, L

The processor 50 can be tasked by the user to monitor voltage relative to a high, medium or low threshold. These thresholds are battery-specific and are stored in memory for several battery types and configurations. For example, the high threshold may be 12.4V, the medium threshold may be 12.1V and the low threshold may be 11.8V. The screens in FIGS. 13 to 20 show in the top corner of each screen, the threshold selected by the user. The threshold shown in the FIGS. 13 to 20 is L. The FIGS. 4, 7 and 8, 9 and 10 also show protection/threshold mode L at 80 on the mobile device screens.

When the selected threshold voltage is identified by the processor 50 as extant in the battery, the processor 50 causes the main relay 55 to switch to a safe position, which is off. That action cuts all power to all the outlets 20. The processor 50 also then sends a signal to the display 32 and the smartphone 90 that the battery has been switched to safe mode. In another aspect of the protective function, when the controller processor 50 detects the low voltage, it causes the display screen 32 or mobile device 90 to display a status indicator (FIG. 8) Voltage violation (amber).

Current Overload

There is at least one other protective function: current overload.

In normal operation, the current sensor 75 measures current and sends that data to the processor 50 which compares it with a threshold. In the circumstance where the current measured is in excess of the threshold, the processor 50 then causes the display of a current violation screen, shown in FIG. 9, and then switches relay 55 to the off position. This commences a dormant phase, controlled by the processor 50.

Overload Modes in Detail: Probation and Dormant

The switch to the safe position is temporary; the processor causes the module 10 to enter a first dormant phase. In the dormant phase, the processor commences a timer, and does not reconnect the loads until a selected time period has elapsed.

In a voltage overload cutoff circumstance, the first dormant phase is about 4 mins. The first dormant phase may be 1, 2, 3, or 5, 6, 7, or 8 minutes, depending on the voltage, temperature and battery conditions.

At the end of the first dormant phase, the processor then switches the main relay to an on position. The processor then enters a first probation period wherein the processor returns to checking the sensors 75 to identify voltage and current, for a selected period, which in one example, is 10 minutes. The first probation period may be 5, 6, 7, 8, 9, 11, 12, 13, 14, 15, 16, 17, 18, 19, or 20 minutes depending on battery type and capacity, and load.

While the processor is in the probation period, if there is a further problem with the same quantity (current, voltage), then the processor causes the main relay to switch to off, and causes a screen to display with a message: OVERLOADED. This commences a second dormant phase, longer than the first dormant phase. The length of this second dormant phase is intended to be about double the length of the first dormant phase.

At the end of the second dormant period, the processor 50 causes the main relay 55 to switch to on, and the processor remains in the probation period until the system stabilises. The processor 50 records the time between voltage and current issues, and monitors stability. Stability for the system is defined as a circumstance where there are no other issues for voltage and current during the probation period.

So, the processor 50 continues to operate the system in a probation phase, and if there is a further issue with one of the sensed quantities exceeding the threshold, then the processor will switch off the system to go into another dormant phase as long as the second dormant phase.

The controller processor 50 causes the display screen or mobile device to display a plurality of relay actuator buttons 36, which are displayed on most screens on the mobile phone 90 when the app is operating. The relay actuator buttons 36 are configured to toggle the relays 56 between off and on positions. The relay actuator buttons are labelled in the configuration screen as discussed above and are configured to control low current draw devices such as for example, lights, which are connected to the four-pin (Phoenix-type) connector.

Display Screens

The processor 50 causes the display screens at FIGS. 13 to 19 to display on the display 32, the screens moving along to the one shown in the subsequent Figure every few seconds. This keeps the user up to date on various metrics of the battery being monitored. The screens inform the user of water tank level (not, of course, strictly a battery health metric), battery voltage, current draw, power used, time remaining at present discharge rate, power use at the present draw rate, power used since last charge, etc.

Figure 20:
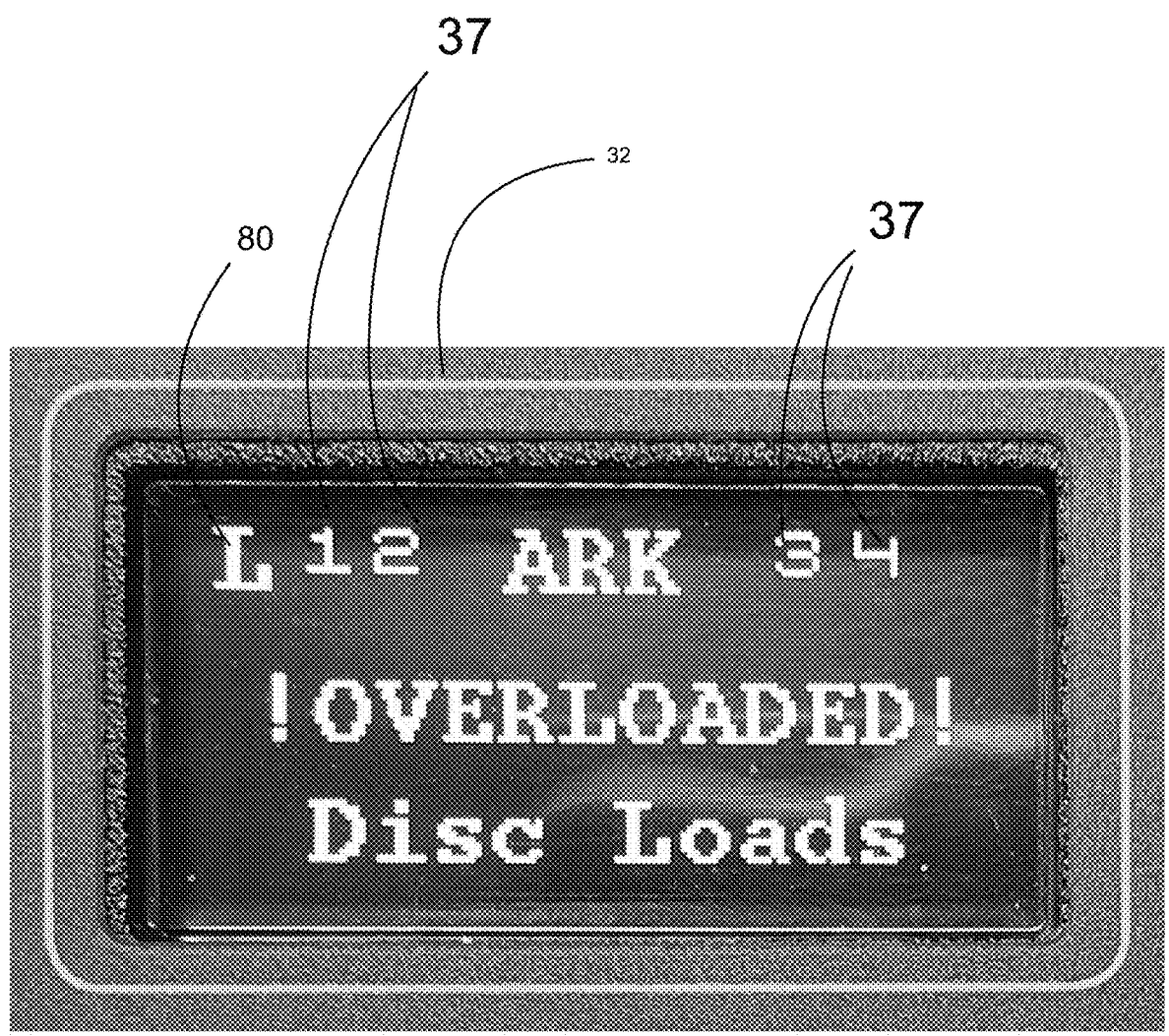
FIG. 20 is another page of the display screen showing control threshold for voltage violation and an overload page.

The screen shown at FIG. 20 is the overload message screen when the processor detects a threshold breach of voltage or current. The display screen 80 includes indication areas 37 which identify which relays have been switched to the off position by the processor 50.

Method Flows

Figure 12:
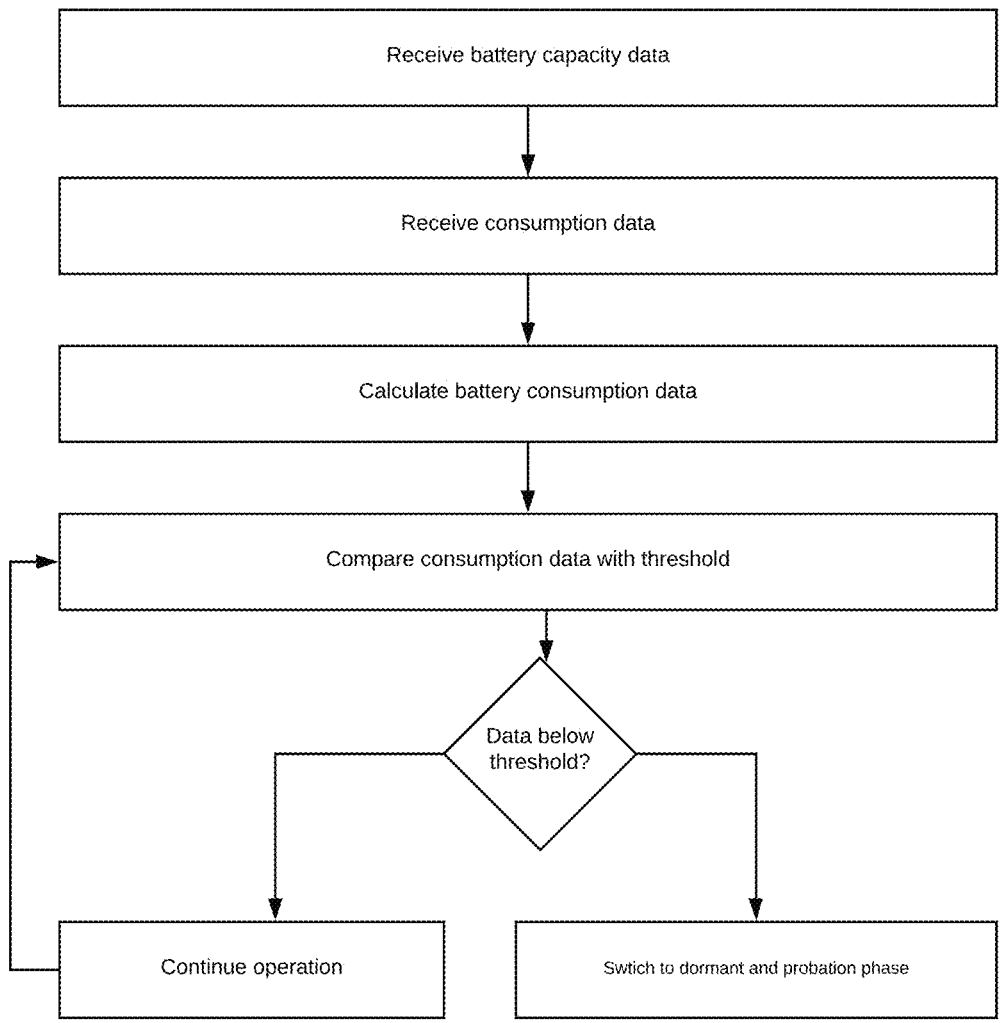
FIG. 12 is a flowchart of a method of an embodiment of the present technology.
Figure 13:
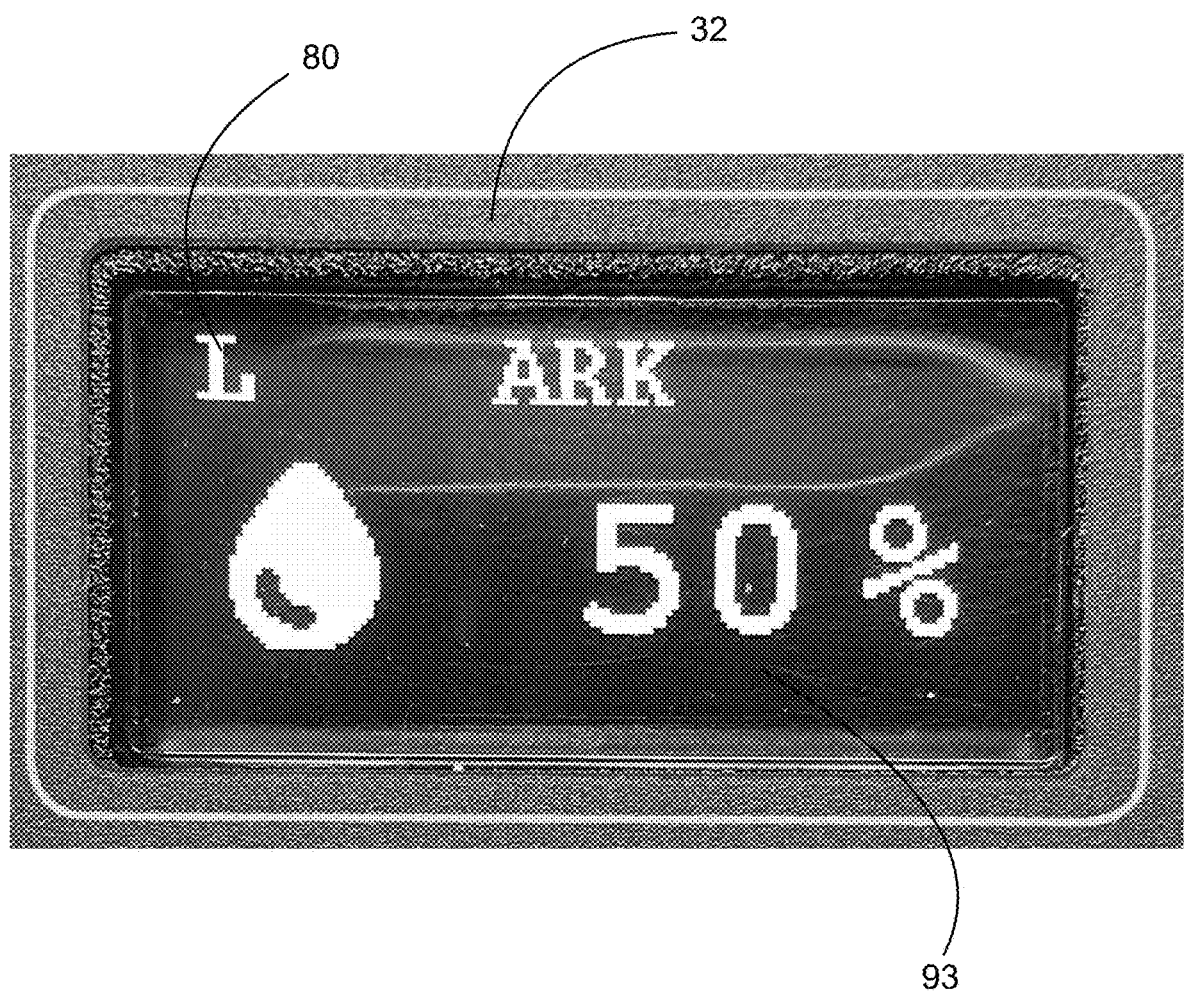
FIG. 13 is a page of a display screen mounted on the housing of the power distribution module showing water tank level and control threshold for voltage violation.
Figure 14:
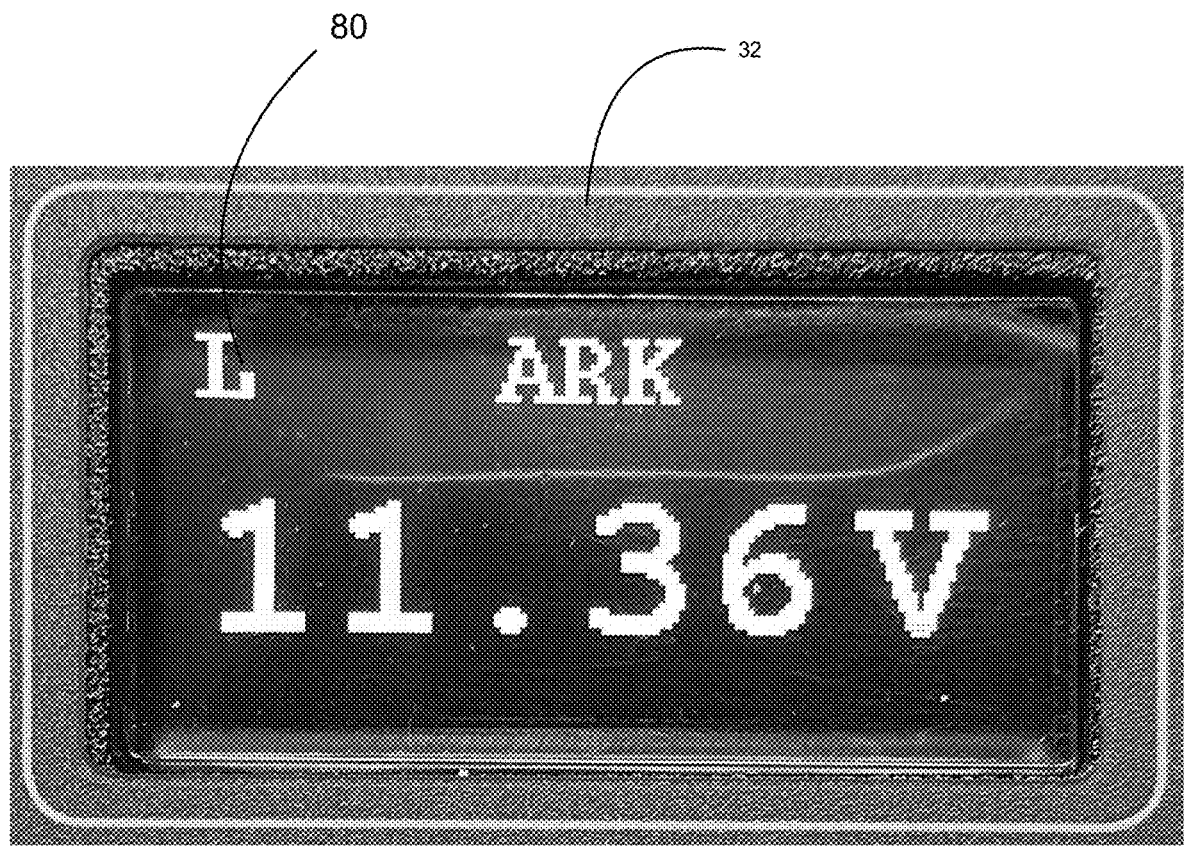
FIG. 14 is another page of the display screen showing control threshold for voltage violation and contemporaneous battery voltage.
Figure 15:
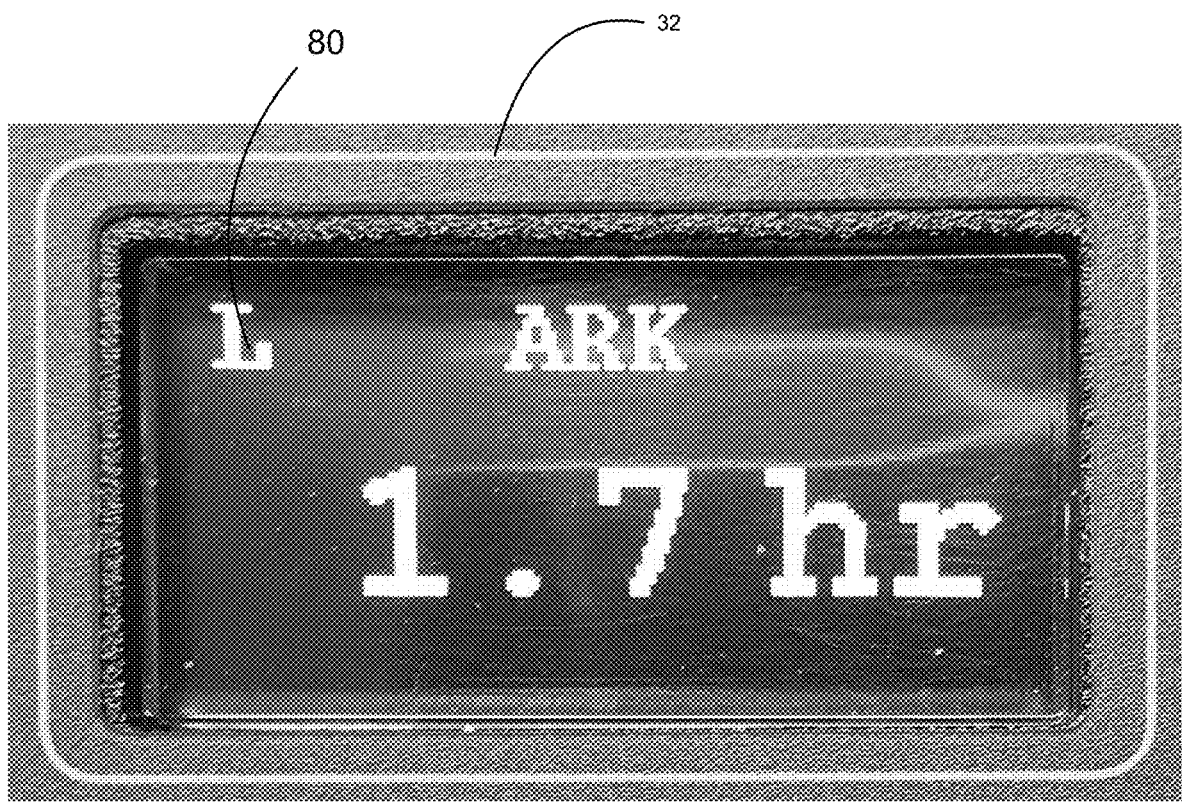
FIG. 15 is another page of the display screen showing control threshold for voltage violation and estimated time until discharge.
Figure 16:
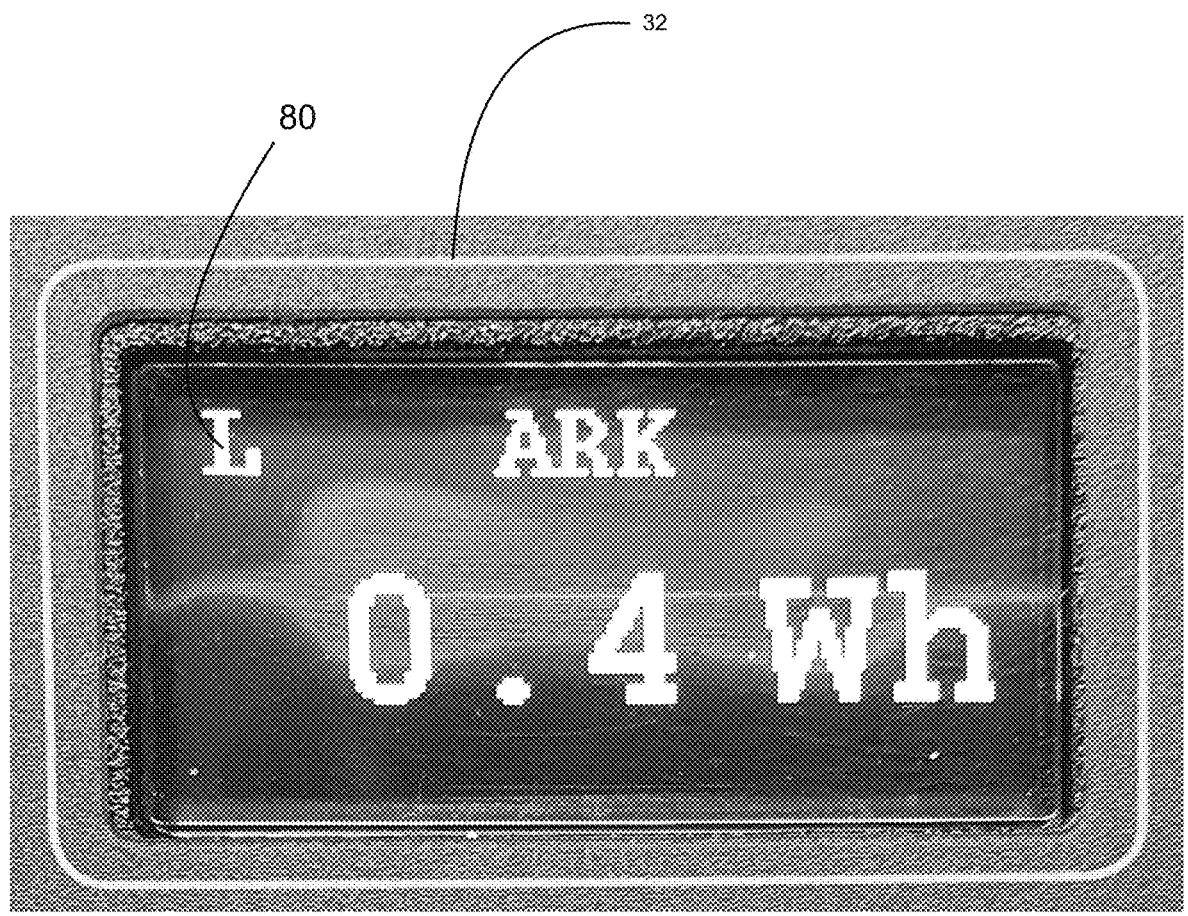
FIG. 16 is another page of the display screen showing control threshold for voltage violation and amount of power in Wh being used by the battery since charge.
Figure 17:
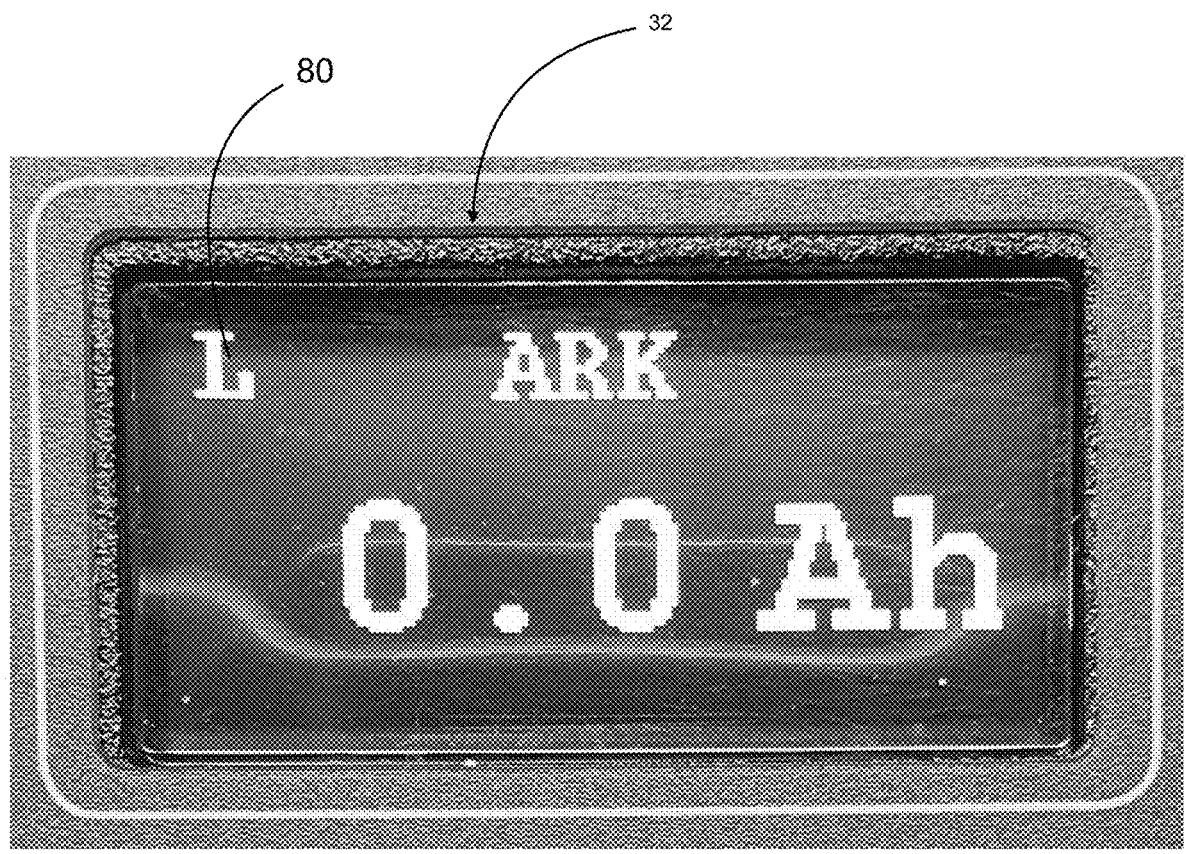
FIG. 17 is another page of the display screen showing control threshold for voltage violation and contemporaneous amount of battery capacity being used.
Figure 18:
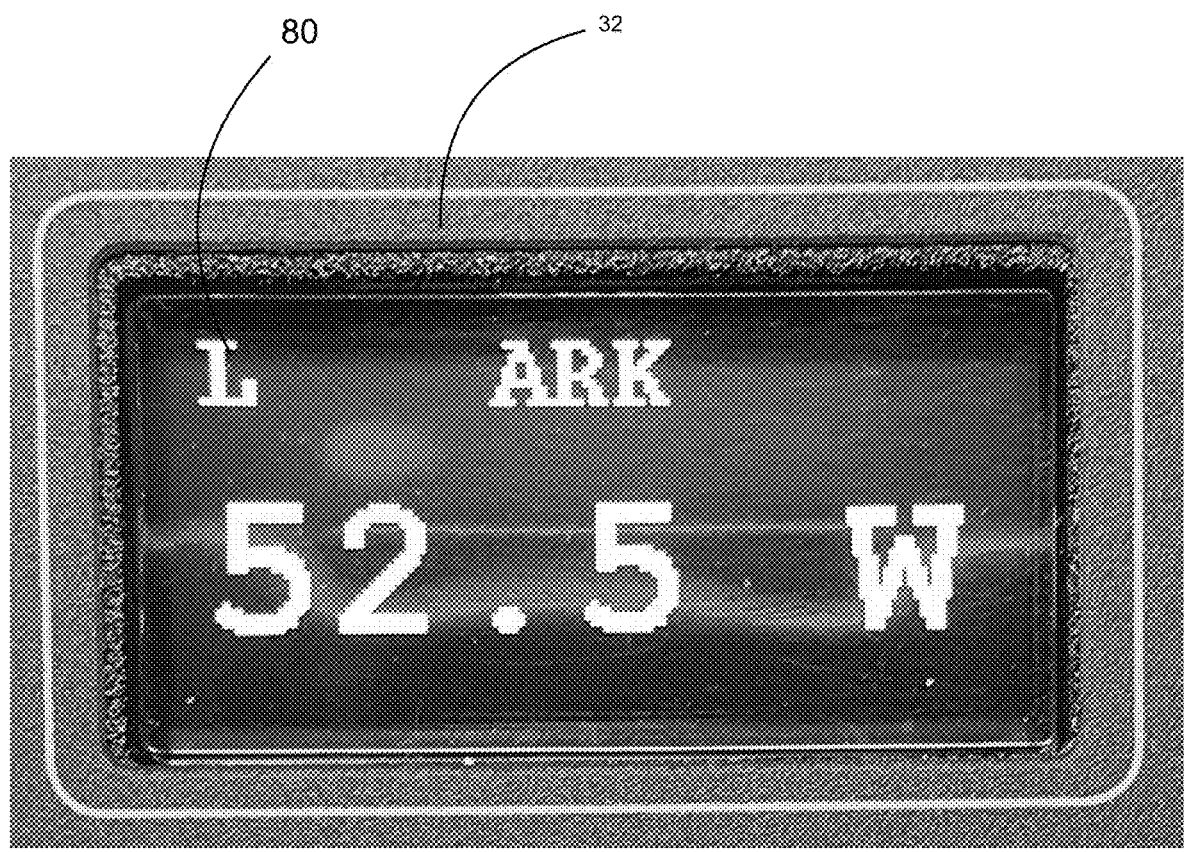
FIG. 18 is another page of the display screen showing control threshold for voltage violation and contemporaneous power consumption.
Figure 19:
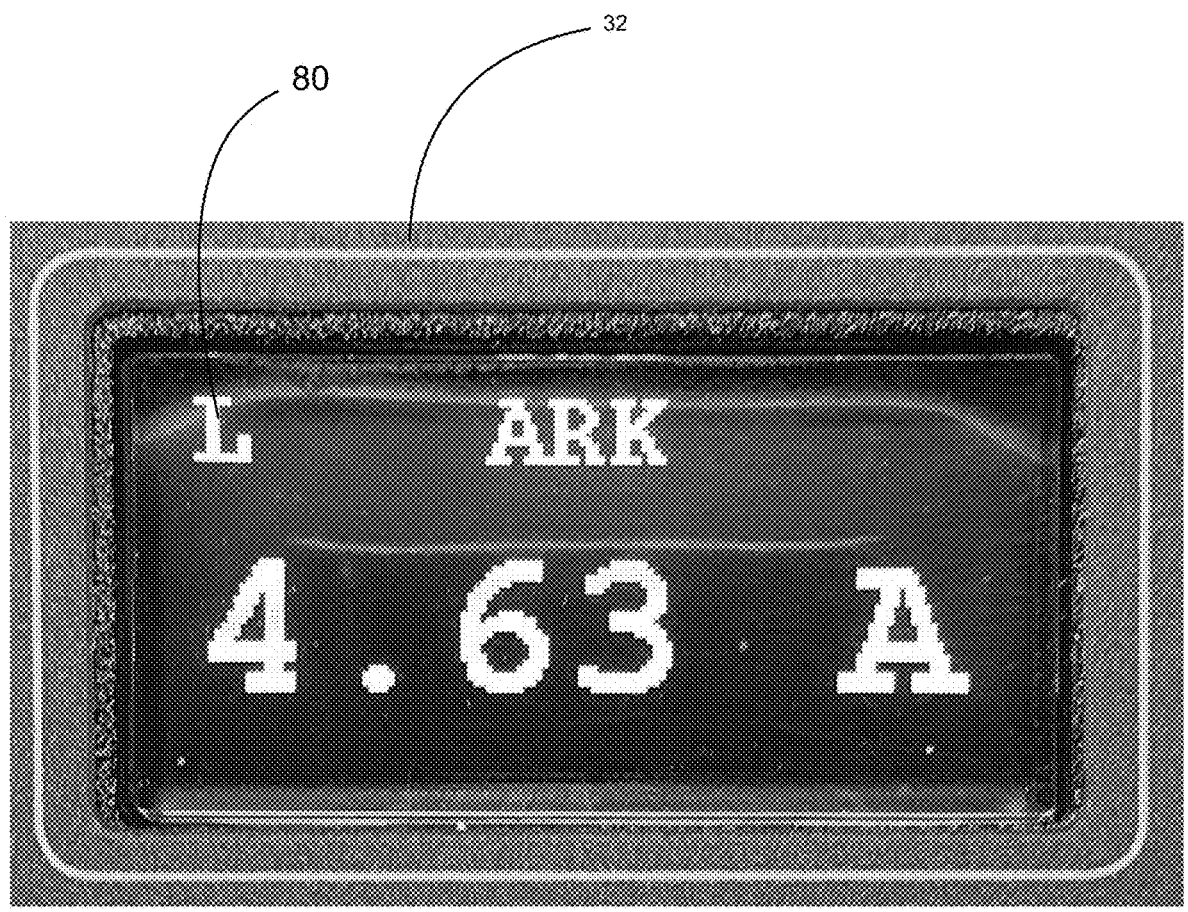
FIG. 19 is another page of the display screen showing control threshold for voltage violation and contemporaneous current draw from the battery.
Figure 21:
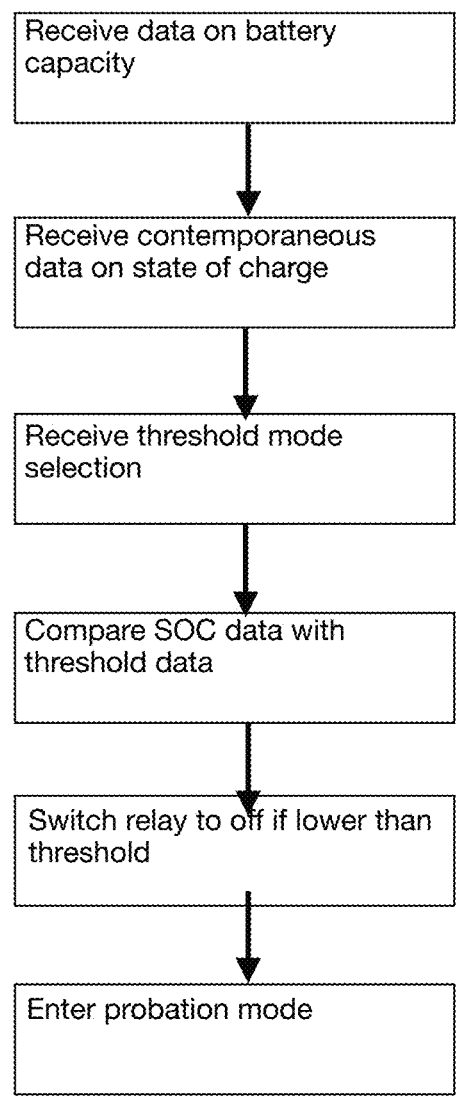
FIG. 21 shows a method of implementing an embodiment of the technology.
Figure 22:
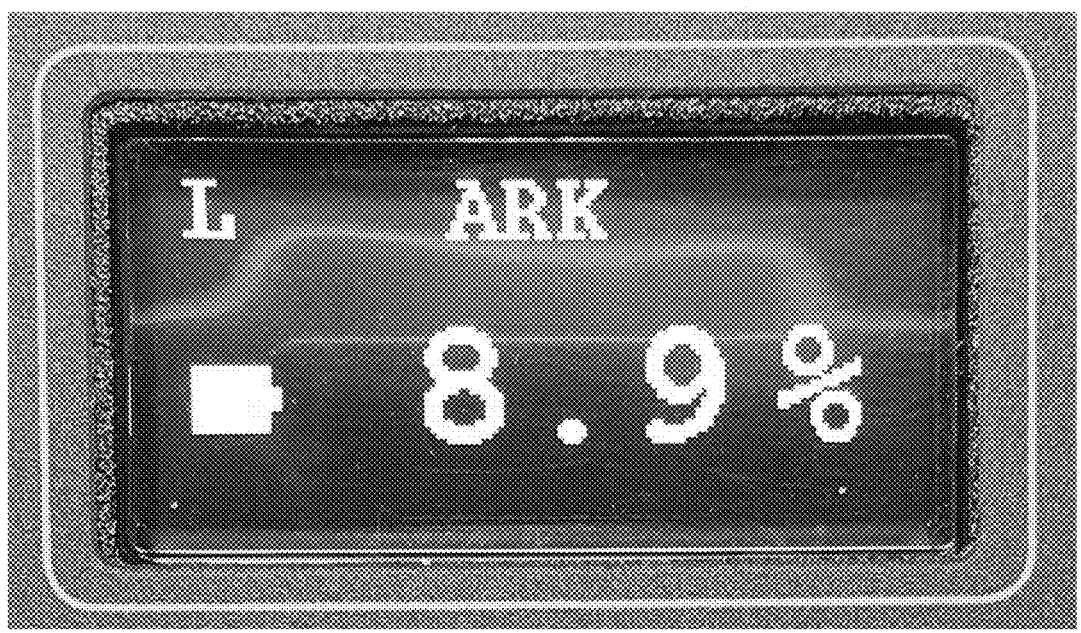
FIG. 22 shows another page of the display screen showing contemporaneous state of charge of the battery.

FIGS. 12 and 21 show features of two methods deployed by embodiments of the present invention.

The methods include steps articulated in the example embodiment and in a broad sense in the summary of the technology above.

Charger

Some variants of the module include a charger.

The charger, when supplied, is in one embodiment, wholly disposed inside the housing at position 76 or it may be a standalone charger in the way of a kit component, which can be plugged in to the housing 30. The charger 76 may be powered by a switch mode power supply by plugging it in.

The charger 76 may be a buck boost charger.

Regardless of the type, charger 76 is electrically connected (or wirelessly connected so that data may flow therebetween) to the processor 50 so that there may be a suitable kind of charging implemented and provided to the battery.

The charger 76 in use may provide different charging stages: Desulphation; Soft Start; Bulk; Absorption; Test; Recondition and Float, as is known.

A solar panel (not shown) provides power to the charger 76 which then charges the battery under the control of the processor 50. In use, the processor 50 receives data from the current and voltage sensors 75 and then commands the charger to provide the battery or outlets with charge.

A mains power supply may also provide power to the charging unit 76.

Clarifications

Modifications and improvements to the invention will be readily apparent to those skilled in the art. Such modifications and improvements are intended to be within the scope of this invention.

We claim:

1. A method of distributing power to one or more power outlets in a power distribution module having one or more battery inlets and a plurality of power outlets and a plurality of relay switches disposed between, the method including the steps of:
   receiving, in a controller processor, data in relation to battery capacity of a battery connected to the power distribution module;
   receiving, in the controller processor, data in relation to elements of power consumption of a plurality of devices connected to each of the plurality of power outlets;
   calculating, in the controller processor, power consumption parameter data from the plurality of power outlets;
   switching, by the controller processor, one or more of the relay switches to a safe position in response to one or more of the calculated power consumption parameter data, relative to a threshold, wherein the safe position includes a first temporary protective dormant phase in response to a first voltage, current or temperature threshold event, followed by a temporary probation phase, in which the controller processor is caused to switch the power distribution module to a second dormant phase longer than the first temporary protective dormant phase.

2. The method in accordance with claim 1 further including the steps of:
   displaying, by a controller processor network module, on a display screen of a wirelessly connected mobile device, at least some of the results of the calculated power consumption parameter data;
   displaying, by the controller processor, selectable relay actuator buttons on the display screen, one or more relay switch actuators configured to switch the one or more relay switches between the safe and engaged positions.

3. The method in accordance with claim 1 further including the step of displaying on a display screen, or a mobile device, a battery configuration screen which requests information regarding the battery from a user, the information including: battery type, battery capacity, and relay names.

4. The method in accordance with claim 1 further including the step of displaying on a display screen, or a mobile device:
   a temperature violation screen when the controller processor calculates that temperature data from a temperature sensor is above a threshold level;
   a current violation screen when the controller processor calculates that current data from a current sensor is above a threshold level, and
   a voltage violation screen when the controller processor calculates that voltage data from a voltage sensor is above a threshold level.

5. A power distribution module including:
   a housing including one or more power inlets and a plurality of power outlets mounted thereon;
   a controller including a processor configured to receive data in relation to battery capacity and to receive data in relation to one or more power parameters provided to the plurality of power outlets;
   one or more power sensors in wireless or other data communication with the processor, the one or more power sensors configured to sense aspects of power flow provided to the plurality of power outlets;
one or more relays in electrical communication with the one or more of the plurality of power outlets and the processor;
wherein the controller is configured to switch the one or more relays on or off in response to processor calculations on the received power parameters relative to selected power, voltage, temperature or current thresholds, wherein, in response to the controller switching the one or more relays to a safe position, the controller is configured to cause the power distribution module to enter a first temporary protective dormant phase in response to a first voltage, current threshold event, followed by a temporary probation phase, in which, if a second voltage or current threshold event occurs, the controller is caused to switch the power distribution module to a second dormant phase longer than the first temporary protective dormant phase.

6. The power distribution module in accordance with claim 5 further including in the housing a network module in communication with the processor for wireless communication with a mobile device or one or more sensors.

7. The power distribution module in accordance with claim 5 wherein the housing includes a wall on which is disposed a display screen, on which the processor causes a display of data relating to any one or more of: one or more power consumption parameters including contemporaneous battery current draw, contemporaneous battery voltage, time left to full discharge, highest voltage measured, lowest voltage measured, energy used since charge, contemporaneous energy in use; battery state of charge; battery type; contemporaneous water tank level.

8. The power distribution module in accordance with claim 5 wherein a plurality of relay actuator buttons are disposed on the housing for actuation of one or more of the relays to an off or an on position.

9. The power distribution module in accordance with claim 5 wherein the plurality of power outlets are selected from the group consisting of: Anderson sockets; 12V cigarette outlets; merit sockets; USB sockets; Engel sockets; four-pin connector, 6-pin connector, 8-pin connector, 9-pin connector.

10. The power distribution module in accordance with claim 5 wherein the processor is configured to receive data from current and voltage sensors and is configured in response to command a charger to provide a battery or the power outlets with suitable charge.

11. The power distribution module in accordance with claim 6 further including a water tank level sensor input port or sensor, which is wirelessly or otherwise connected to the processor.

12. The power distribution module in accordance with claim 7 wherein the processor is configured to cause the display screen or a mobile device to represent battery state of charge as a circle indicator when the battery state of charge data indicates full, and with an arc if the battery state of charge data indicates the battery is less than full.

13. The power distribution module in accordance with claim 7 wherein the processor causes the display screen or a mobile device to represent battery state of charge as a numerical percentage disposed within a battery state of charge circle.

14. The power distribution module in accordance with claim 7 wherein the processor causes the display screen or a mobile device to represent contemporaneous water tank level as a circle when the water tank level data indicates full, and with a partially closed circle if the water tank level data indicates less than full.

15. The power distribution module in accordance with claim 7 wherein the processor is configured to cause the display screen or a mobile device to present a high level information screen which displays contemporaneous voltage, contemporaneous current draw, contemporaneous power usage, total energy used since last charge, contemporaneous projected time to full discharge, battery type, and battery capacity, and relay actuator buttons; and a detailed dashboard information screen which displays one or more of: contemporaneous voltage; maximum recorded voltage since last charge on a connected battery; lowest voltage recorded since last charge on the connected battery; contemporaneous current draw; maximum current draw on the connected battery since last charge; contemporaneous power use; module temperature; battery capacity; battery type; energy drawn since last charge for the connected battery (Ah); energy drawn from the connected battery since last charge (Wh); battery state of charge in a percentage and as a circle; water tank level as a percentage and as a circle; relay actuator buttons; and a status indicator.

16. The power distribution module in accordance with claim 7 wherein the processor is configured to cause the display screen or a mobile device to display a battery configuration screen which requests certain information regarding a connected battery from a user, including: battery type, battery capacity, data relating to water tank level, and relay names, as well as, in response to receiving data from sensors: a temperature violation screen, which displays a contemporaneous temperature; a status indicator; a plurality of relay actuator buttons; a current violation screen, which includes a current violation indicator; a status indicator; a current measurement maximum which caused a violation.

17. The power distribution module in accordance with claim 5 wherein a main relay is disposed in a conductor which extends between the one or more power inlets and the plurality of power outlets and the controller is connected directly to the main relay so as to facilitate rapid switching of current to the plurality of power outlets to a safe state wherein the main relay switches to an off position in response to a voltage violation event, or current violation event, or a temperature violation event.

18. The power distribution module in accordance with claim 5 further including a multi-stage charger to charge a connected battery with a plurality of charging stages selected from the group consisting of: Desulphation; Soft Start; Bulk; Absorption; Test; Recondition and Float.

* * * * *